United States Patent
Costa et al.

(10) Patent No.: US 12,434,208 B2
(45) Date of Patent: Oct. 7, 2025

(54) CONTINUOUS PROCESSING SYSTEM AND METHODS FOR INTERNAL AND EXTERNAL MODIFICATIONS TO NANOPARTICLES

(71) Applicant: University of Connecticut, Farmington, CT (US)

(72) Inventors: Antonio P. Costa, Farmington, CT (US); Diane J. Burgess, Farmington, CT (US)

(73) Assignee: University of Connecticut, Farmington, CT (US)

( * ) Notice: Subject to any disclaimer, the term of this patent is extended or adjusted under 35 U.S.C. 154(b) by 1033 days.

(21) Appl. No.: 17/286,956

(22) PCT Filed: Oct. 28, 2019

(86) PCT No.: PCT/US2019/058305
§ 371 (c)(1),
(2) Date: Apr. 20, 2021

(87) PCT Pub. No.: WO2020/087064
PCT Pub. Date: Apr. 30, 2020

(65) Prior Publication Data
US 2021/0379545 A1 Dec. 9, 2021

Related U.S. Application Data

(60) Provisional application No. 62/751,162, filed on Oct. 26, 2018.

(51) Int. Cl.
*B01F 33/3033* (2022.01)
*A61K 9/127* (2025.01)
(Continued)

(52) U.S. Cl.
CPC ........ *B01F 33/3033* (2022.01); *A61K 9/1271* (2013.01); *A61K 9/1278* (2013.01);
(Continued)

(58) Field of Classification Search
None
See application file for complete search history.

(56) References Cited

U.S. PATENT DOCUMENTS 8,540,939 B2 9/2013 Niesz
2002/0144644 A1 10/2002 Zehnder
(Continued)

FOREIGN PATENT DOCUMENTS

JP 2889549 B2 5/1999
JP 2002529240 A 10/2002
(Continued)

OTHER PUBLICATIONS

International Search Report for corresponding PCT application No. PCT/US2019/058305 dated Jun. 29, 2020.
(Continued)

*Primary Examiner* — Elizabeth A Robinson
*Assistant Examiner* — Brittany I Fisher
(74) *Attorney, Agent, or Firm* — McDonnell Boehnen Hulbert & Berghoff LLP

(57) ABSTRACT

The present disclosure provides a system for the internal and external modification of nanoparticles in a continuous process. The system includes (a) a first inlet, (b) a second inlet, (c) a first pump in fluid communication with the first inlet, (d) a second pump in fluid communication with the second inlet, (e) a first flow meter positioned between the first pump and the first mixer, (f) a second flow meter positioned between the second pump and the first mixer, and (g) a mixing chamber in fluid communication with the first flow
(Continued)

meter and the second flow meter, and (h) a first heat exchanger in fluid communication with the mixing chamber.

21 Claims, 11 Drawing Sheets

(51) Int. Cl.
| | |
|---|---|
| *A61K 9/1271* | (2025.01) |
| *A61K 9/1278* | (2025.01) |
| *A61K 9/50* | (2006.01) |
| *B01F 25/433* | (2022.01) |
| *B01F 35/21* | (2022.01) |
| *B01F 35/71* | (2022.01) |
| *B01F 35/90* | (2022.01) |
| *B01J 13/04* | (2006.01) |
| *B82Y 5/00* | (2011.01) |
| *B82Y 35/00* | (2011.01) |
| *B82Y 40/00* | (2011.01) |

(52) U.S. Cl.
CPC ........ *B01F 25/433* (2022.01); *B01F 35/2111* (2022.01); *B01F 35/7176* (2022.01); *B01F 2035/99* (2022.01); *B82Y 5/00* (2013.01); *B82Y 35/00* (2013.01); *B82Y 40/00* (2013.01)

(56) References Cited

U.S. PATENT DOCUMENTS

| | | | |
|---|---|---|---|
| 2004/0091546 | A1 | 5/2004 | Johnson |
| 2005/0129580 | A1 | 6/2005 | Swinehart |
| 2009/0269250 | A1 | 10/2009 | Panagiotou |
| 2011/0104043 | A1* | 5/2011 | Niesz ............... A61P 11/00 977/773 |
| 2011/0110179 | A1* | 5/2011 | Richards .......... G05D 11/139 366/152.2 |
| 2011/0250264 | A1 | 10/2011 | Schutt |
| 2017/0128952 | A1* | 5/2017 | Oki ................... B03C 1/025 |
| 2019/0029959 | A1* | 1/2019 | Costa ............... B01F 25/313 |
| 2019/0094118 | A1* | 3/2019 | Westerhoff ........... G01J 3/00 |

FOREIGN PATENT DOCUMENTS

| | | |
|---|---|---|
| JP | 2005298486 A | 10/2005 |
| JP | 2009240954 A | 10/2009 |
| JP | 2016117669 A | 6/2016 |
| WO | 2002/078674 A1 | 10/2002 |
| WO | 2004/076056 A2 | 9/2004 |
| WO | 2011/106565 A1 | 9/2011 |
| WO | 2016/149625 A1 | 9/2016 |

OTHER PUBLICATIONS

Written Opinion for corresponding PCT application No. PCT/US2019/058305 dated Jun. 29, 2020.

* cited by examiner

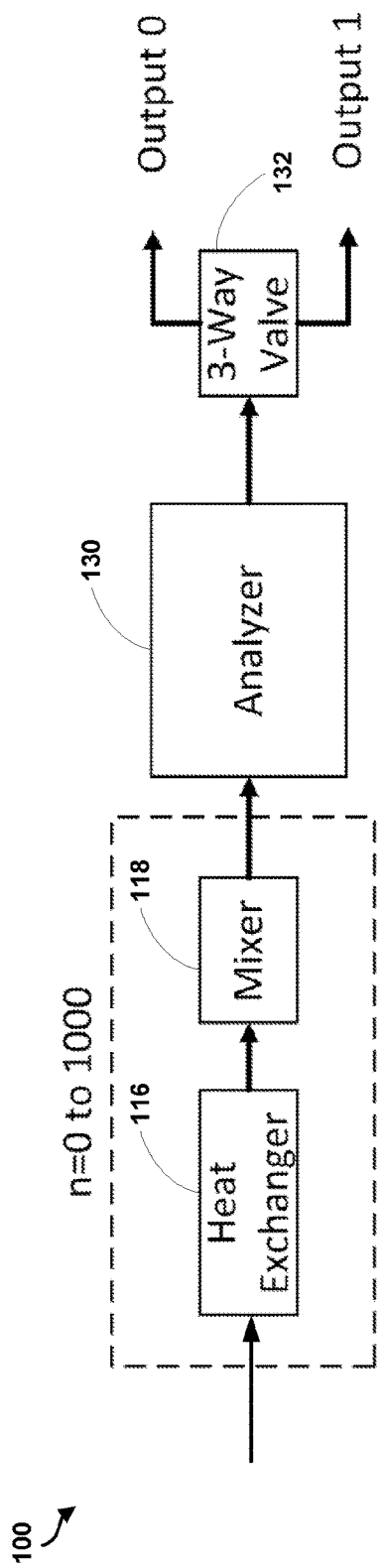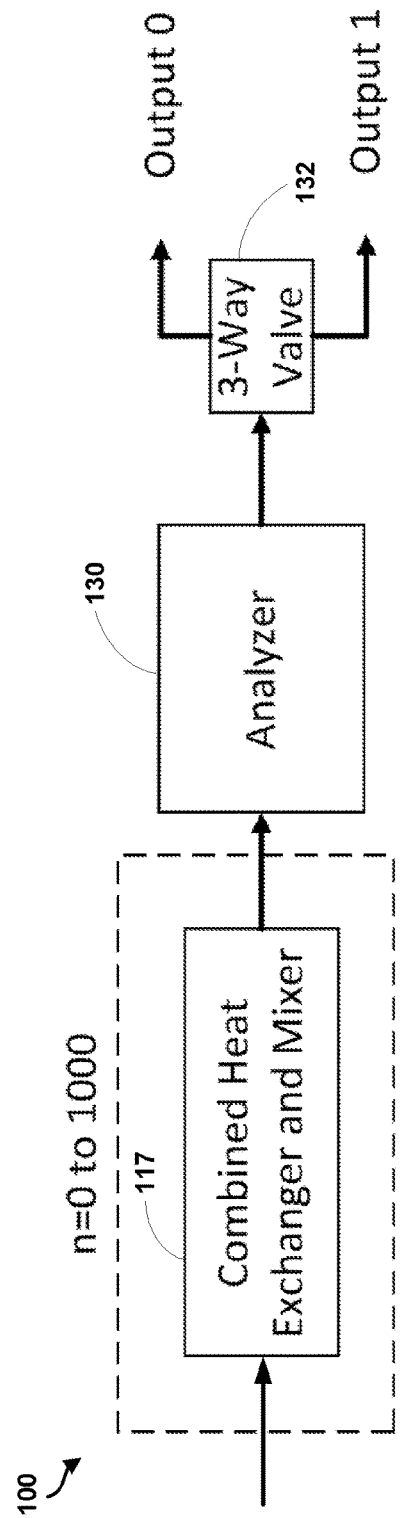
Fig. 6
Fig. 7

CONTINUOUS PROCESSING SYSTEM AND METHODS FOR INTERNAL AND EXTERNAL MODIFICATIONS TO NANOPARTICLES

CROSS REFERENCE TO RELATED APPLICATION

This application is a U.S. National Phase application of, and claims the benefit of, International (PCT) Application No. PCT/US2019/058305, filed Oct. 28, 2019, which claims priority to U.S. Provisional Application No. 62/751,162 entitled "Production of Liposomal Particles as a Reactor for Molecular Growth," filed on Oct. 26, 2018, the contents of which are hereby incorporated by reference in its entirety.

GOVERNMENT RIGHTS

This invention was made with government support under contract numbers HHSF223201610121C and U01 FD005773 awarded by the United States Food and Drug Administration. The government has certain rights in the invention.

BACKGROUND

The present disclosure relates to a continuous processing system for the controlled modification of pre-formed vesicular nanoparticles such as liposomes and other similar structures such as polymeric vesicles made from amphiphilic block copolymers. The processing system establishes a fast, efficient, and continuous process to control both intravesiclar and extravesiclar modifications to nanoparticles. In the intravesicular aqueous space, molecules can be loaded via an active loading method to promote nanocrystal formation and growth. On the extravesicular surface, modifications include the addition of polymeric coatings and addition of active drug moieties. The processing system outlined herein is suitable for a single modification or simultaneous nanoparticle modifications in a continuous process that is apt for nanoparticle manufacturing.

Liposomal nanoparticles are colloidal dispersions that are composed of one or more lipid-bilayers that surround an aqueous core. Important physicochemical properties of liposomes such as the hydrodynamic diameter or particle size, surface charge (typically measured as zeta-potential), lipid-packing, bilayer lamellarity, encapsulation efficiency, drug encapsulation, molecular loading and external modifications (such as polymer coatings and targeting moiety incorporation) are necessary to accurately control and measure to properly manufacture a pharmaceutical drug product. Liposomal nanoparticles can be formed to have a hydrodynamic diameter (in nanometers [d·nm]) ranging from approximately 30 d·nm to over 1,000 d·nm. For liposomal nanoparticles that are less than 1,000 d·nm, these particles exhibit Brownian motion and remain as a colloidal dispersion since the thermal motion of the particles overcome gravitational forces that would otherwise increase the likelihood of sedimentation.

There are many methods to form liposomal nanoparticles. One method is based on the solvent injection approach, where lipid molecules are dissolved in an organic solvent phase (e.g. ethanol) and the lipid/solvent is injected into an aqueous phase. By using this and similar approaches, empty liposomes can be formed at precise particle sizes. However, these pre-formed liposomes may lack molecular entrapment (e.g. of a drug molecule) and also surface modifications (e.g. polymer coatings) and will require multiple, subsequent processes to make such modifications.

A mechanism to load molecules in the intraliposomal space of pre-formed liposomes is known as remote loading (also referred to as active loading). Examples of molecules that can be loaded by this approach include amphipathic weak acids and bases such as doxorubicin, daunorubicin, epirubicin, idarubicin, vincristine and irinotecan hydrochloride. In one method, the active loading process includes first forming a liposomal dispersion in a high salt aqueous phase (e.g. 250 millimolar [mM]) followed by removing unencapsulated or extra-liposomal salt. Examples of salts applicable to this method include the ammonia salts of sulfate, phosphate, citrate, acetate, among others. The difference in salt concentration between the intraliposomal environment and the extraliposomal environment, along with a transmembrane pH gradient, establishes a driving force for the aforementioned molecules to enter the liposomal interior. Moreover, intraliposomal and extraliposomal pH values are important to control in order to perform the loading process.

Additional factors that impact the active loading include the partition coefficient of the loading molecule and its negative log of the acid dissociation constant (pKa). Accordingly, in order to achieve a high degree of drug loading, these molecules are partially unionized at the loading pH and are able to permeate through the lipid-bilayer. Upon permeating through the bilayer and partitioning into the intraliposomal aqueous space, the molecule may undergo precipitation, crystallization or gelation. For example, doxorubicin-hydrochloride has been referred to as a nanorod or nanocrystal, which is formed when the active loading process incorporates ammonium sulfate at salt concentrations over 150 mM, or as precipitates of doxorubicin sulfate, which are formed when the intraliposomal space is typically less than 100 mM salt concentrations.

Conventional pharmaceutical manufacturing is operated as a batch process, which typically requires large volumes of liposomes to be processed (e.g. hundreds of liters) at multiple stages. For example, the first stage may be to form pre-formed, empty liposomes followed by multiple tangential flow filtration stages and further followed by an active loading stage. One problem with the remote loading approach while operating as a batch process is that this approach requires prolonged times (e.g. up to several hours) and adequate heating in order to achieve over 90% drug encapsulation. In addition, conventional approaches require that the extraliposomal aqueous phase to be at a very low salt concentration compared to the intraliposomal space to establish a sufficient salt gradient. In this manner, prolonged batch processing times, large processing volumes, high temperatures (e.g. over 60 degrees Celsius) and removal processes of extraliposomal salt are barriers to effectively implement the active loading approach for large-scale manufacturing on a wide scale.

A second problem is that actively-loaded molecules may form multiple structural states or morphologies, especially during batch manufacturing. These structural states may include salt-drug precipitates and nanocrystals of various shapes (e.g. rod-like appearance and curved structures) and nanocrystals of various lengths. These different structural states are also known to affect nanoparticle stability, drug dissolution from the intraliposomal space and may even lead to adverse reactions by activation of the human complement system, inter alia. With respect to complement activation, it has been proposed that elongated nanoparticles, i.e. particles with an apparent aspect ratio of >1.15, which is caused by extended crystal growth, may cause palmar-plantar erythrodystheisa (also known as hand-foot syndrome). This elongation of the nanoparticles can occur when the nanocrystal growth is uncontrolled during the active loading processing stage. Accordingly, without proper control of the crystal growth in the liposomal compartment, a pharmaceutical drug product may vary from batch to batch, which could lead to variability in the drug product's effectiveness and safety over the product's lifespan. Moreover, generic pharmaceutical drug formulations may have different safety data and exhibit dissimilar adverse reactions when compared to a reference listed drug product (or a reference standard in some cases).

In another aspect, an environment for the study of controlled structural growth kinetics of nanocrystals is difficult to form. In this manner, the intraliposomal compartment can be considered as a reactor to study the growth of various structures and phases. Moreover, as the liposomal colloidal dispersion is subject to Brownian motion, and to a lesser degree impacted by the effects of gravity (e.g. sedimentation), it becomes an important tool that can be used to study crystal growth kinetics by observing structural formation within a confined, isolated aqueous environment, i.e. the intravesicular aqueous space.

SUMMARY OF THE INVENTION

In one aspect, the present disclosure provides a system for internal and external modification of nanoparticles in a continuous process, the system comprising (a) a first inlet, (b) a second inlet, (c) a first pump in fluid communication with the first inlet, (d) a second pump in fluid communication with the second inlet, (e) a first flow meter in fluid communication with the first pump, (f) a second flow meter in fluid communication with the second pump, (g) a mixing chamber in fluid communication with the first flow meter and the second flow meter, and (h) a first heat exchanger in fluid communication with the mixing chamber.

In another aspect, the present disclosure provides a method for internal and external modification of nanoparticles in a continuous process, the method comprising (a) providing a pre-liposomal colloidal dispersion to a first inlet at a first flow rate, (b) providing a compound dissolved in an aqueous solution to a second inlet at a second flow rate, (c) mixing the pre-liposomal colloidal dispersion and the compound dissolved in the aqueous solution to create a well-mixed colloidal and molecular dispersion, (d) applying heat to the well-mixed colloidal and molecular dispersion via a first heat exchanger to create a plurality of modified nanoparticles, and (e) quantifying, via one or more analyzers, one or more structural attributes of the plurality of modified nanoparticles.

In yet another embodiment, the present disclosure provides a non-transitory computer readable medium having stored thereon instructions, that when executed by one or more processors, cause a system for the continuous production of liposomes to perform the operations of the just described method.

The system and methods disclosed herein can be implemented as an important tool in the understanding and isolation of the structural formation within a confined compartment and may have a significant role in the pharmaceutical and beverage industry. As liposomes can be precisely formed at specified size distributions, reactors ranging from 25 nm to 1000 nm can be formed to fully understand structural growth kinetics in a confined environment.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 6 is a schematic representation of another embodiment of the system of FIG. 2, according to an example embodiment.

FIG. 7 is a schematic representation of another embodiment of the system of FIG. 2, according to an example embodiment.

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Furthermore, the particular arrangements shown in the Figures should not be viewed as limiting. It should be understood that other embodiments may include more or less of each element shown in a given Figure, and may include combinations of elements from different Figures. Further, some of the illustrated elements may be combined or omitted. Yet further, an example embodiment may include elements that are not illustrated in the Figures.

As used herein, with respect to measurements, "about" means+/−5%.

As used herein, "nanoparticles" means particles having a diameter ranging from about 10 nm to about 1000 nm such as liposomes, solid lipid nanoparticles, lipid complexes, and polymeric micelles as non-limiting examples.

Figure 1:
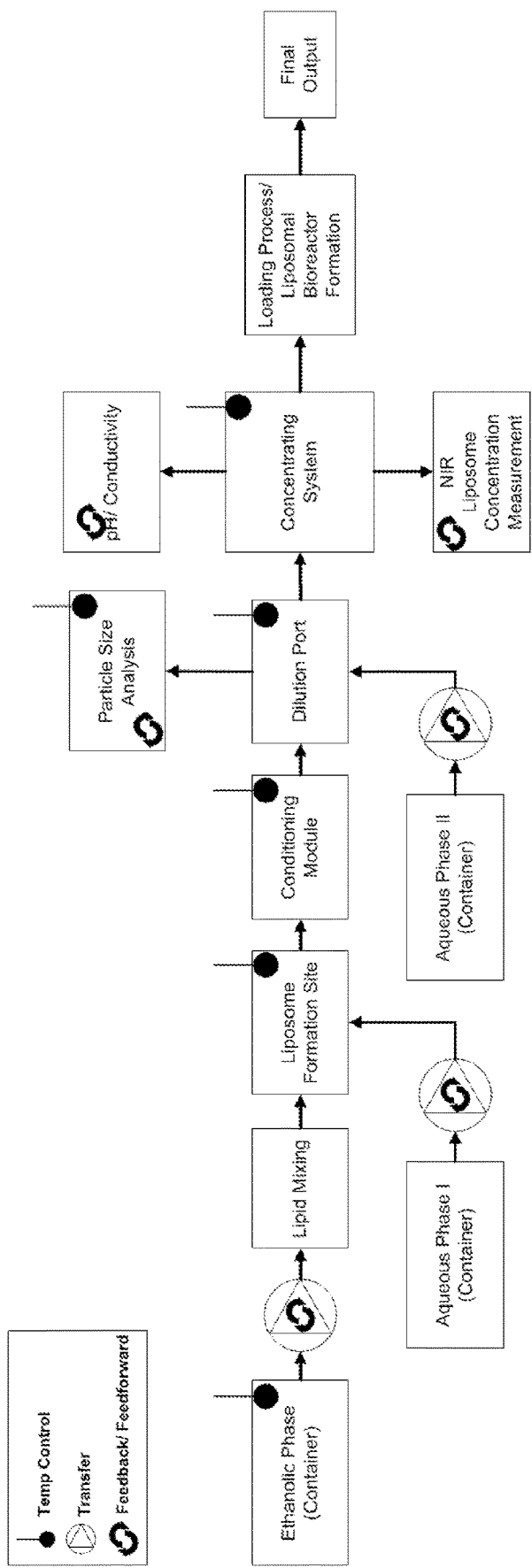
FIG. 1 is a schematic representation of a system for the continuous manufacturing process for the production of nanoparticles, according to an example embodiment.

FIG. 1 is an example of a continuous process for the formation of nanoparticles using a solvent injection approach. This approach can be used to form various nanoparticles (i. e. from around 10 nm up to 1000 nm) such as liposomes, solid lipid nanoparticles, lipid complexes, polymeric micelles, etc. The system of FIG. 1 may include one or more of the features disclosed in U.S. patent application Ser. No. 15/557,575, the contents of which are incorporated by reference in their entirety. As shown in FIG. 1, the nanoparticle formation system comprises of multiple segments, including a loading process or nanoparticle modification segment, which is used to modify the intra-particle and extra-particle characteristics. The nanoparticle modification segment will be discussed in additional detail below. Accordingly, the systems described herein may be used in conjunction with the system outlined in FIG. 1, for example by being inserted where the loading process is positioned. In another example, the nanoparticle modification systems described below can be standalone systems that are separate from the nanoparticle formation system of FIG. 1.

Figure 2:
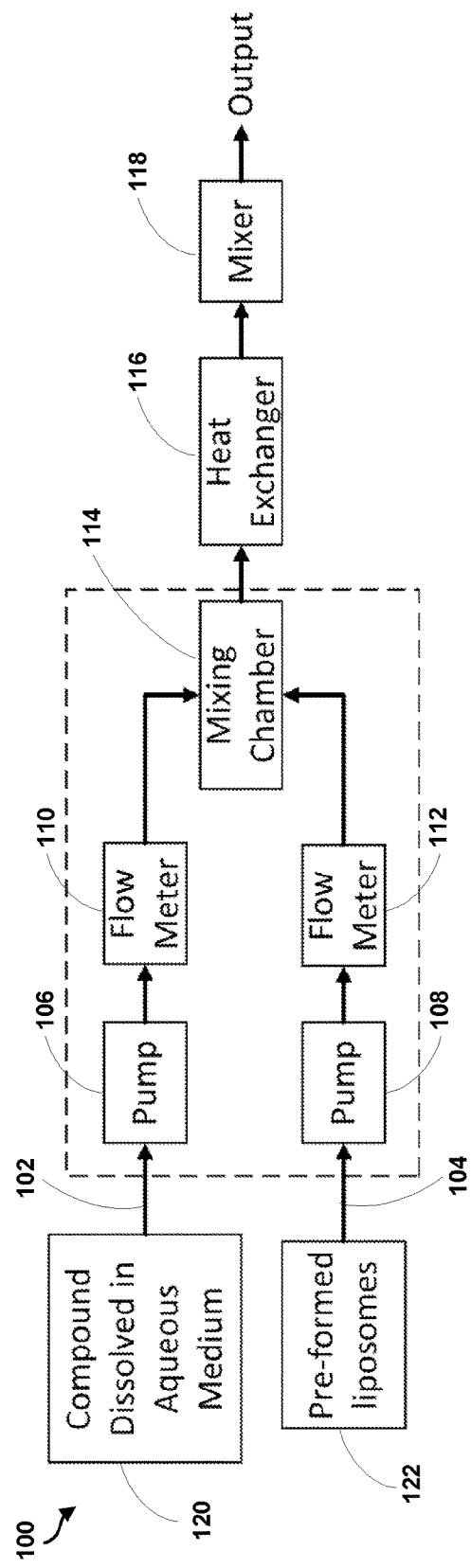
FIG. 2 is a schematic representation of a system, according to an example embodiment.

FIG. 2 illustrates an example system 100 for internal and external modification of nanoparticles in a continuous process. As shown in FIG. 2, the system 100 includes a first inlet 102 and a second inlet 104. The system 100 further includes a first pump 106 in fluid communication with the first inlet 102, and a second pump 108 in fluid communication with the second inlet 104. The system further includes a first flow meter 110 in fluid communication with the first pump 106, and a second flow meter 112 in fluid communication with the second pump 108. The system further includes a mixing chamber 114 in fluid communication with the first flow meter 110 and the second flow meter 112. In one example, the mixing chamber 114 is a static mixer configured to combine solutions from the first inlet 102 and the second inlet 104. The system also includes a first heat exchanger 116 in fluid communication with the mixing chamber 114. In one example, the system 100 further includes a first mixer 118 in fluid communication with the first heat exchanger 116. In one example, as shown in FIG. 2, the first heat exchanger 116 and first mixer 118 are separate components with the first mixer 118 positioned downstream from the first heat exchanger 116. In another example, the first heat exchanger 116 and first mixer 118 are combined into a single component 117. In one example, as shown in FIG. 2, the first inlet 102 is in fluid communication with a first container 120, and the second inlet 104 is in fluid communication with a second container 122. In one particular example, the first container 120 may include a compound dissolved in an aqueous medium, and the second container 122 may include pre-formed liposomes. In another example, the second inlet 104 is in fluid communication with an output of a system for the continuous formation of nanoparticles, such as the system shown in FIG. 1.

FIG. 2 is a first embodiment of the system 100 for nanoparticle modification, where a molecule (such as doxorubicin-HCL) is dissolved in an aqueous medium (e.g. histidine buffer) and pre-formed liposomes (with a high intra-liposomal salt concentration) are mixed together, where the mixing and heating causes the liposomal nanoparticle to be modified. As one example, the "active loading" of doxorubicin-HCl into liposomes can be achieved by first forming the liposomes with a battery of ammonium sulfate (e.g. 250 mM) in the intra-liposomal space and pre-processing these liposomes by removing the extra-liposomal ammonium sulfate salt (e.g. to less than 5 mM). These pre-formed, pre-processed liposomes are then mixed with doxorubicin-HCl in a histidine/sucrose buffer by being injected into a mixing chamber and flow continuously to a downstream heat exchanger and mixer at a fixed flow rate. The degree of heating can be controlled by the flow rate and the temperature of the heat exchanger. Typically, temperatures between 40-90 degrees Celsius are used to promote this active loading process.

As such, the system 100 and methods disclosed herein can be used for controlled drug encapsulation or drug loading in pharmaceutical drug product processing. In this case, the morphology of the nanoparticle (e.g. liposome) can be dependent on the morphology of the intraliposomal structure (e.g. a crystal growth or salt complex). Changes in morphology that form non-spherical structures may affect the human complement system and can cause syndromes such as palmar-plantar erythrodysesthesia. One way to assess the morphology of a liposomal nanoparticle is to measure the apparent aspect ratio, which is the ratio of the largest diameter divided by the smallest diameter of a particle. For an apparent aspect ratio equal to one, the particle is spherical, whereas aspect ratios (ARs) greater than 1.05 tend to indicate elongated structures. These elongated structures may cause issues when introduced into the body. By controlling parameters such as (1) flow properties, such as the residence time in the flow process stream, (2) heating duration, (3) magnitude of heating, (4) extent of mixing, (5) the intra-liposomal salt concentration, (6) the extra-liposomal salt concentration, (7) the intraliposomal pH value and (8) the extra-liposomal pH value, the degree of molecular encapsulation and subsequent crystal growth or precipitation can be precisely controlled. Moreover, the system 100 described herein coupled with static mixers can be used to control the amount of mixing throughout the process. Lastly, the system 100 further coupled with one or more analyzers as discussed in additional detail below further enables control of drug encapsulation and can be used to accurately predict the drug encapsulation and/or crystal growth. Therefore, the system 100 described herein enables one to form nanoparticles with a controlled morphology that is well-suited for pharmaceutical applications, which can lead to high-quality drug products that may lead to minimized adverse reactions (patient complications), reduced safety issues and reduced drug product lot/batch variability.

As a second example, the system 100 of FIG. 2 can be used to modify the surface characteristics of liposomal nanoparticles, where a lipopolymer is inserted into the outer leaflet of the lipid bilayer (post-insertion method). In this case, a lipopolymer such as DSPE-mPEG2000 can be added into the first inlet 102. Pre-formed liposomes are added to the second inlet 104 and the two process streams are mixed at fixed flow rates using the pump/flow meters. The degree of heating can be controlled by the flow rate, the temperature of the first heat exchanger 114 and the first mixer 118. Typically, temperatures between 60-90 degrees Celsius are used to promote this post-insertion method.

As such, the system 100 and methods disclosed herein can be used for modifying the surface of nanoparticles such as liposomes with molecules that can be introduced into the nanoparticle's surface following the known "post-insertion" method. Molecules that can be inserted using this method into a nanoparticle, such as a liposome, may include lipopolymers such as DSPE-mPEG(2000) or other similar molecules. In addition, these molecules may have active components such as an "active pharmaceutical ingredient" (API) linked to the hydrophilic region of the molecule used for insertion. One example would be an activated PEG phospholipid such as DSPE-PEG-Maleimide that can be linked with a thiol-containing oligonucleotide, polynucleotide, peptide and/or small molecule. Typically, these insertion molecules have both a hydrophobic region and hydrophilic region and can form micellar structures when mixed with an aqueous phase. Upon heating and mixing with a liposomal dispersion, these micellar structures will insert into the outer leaflet of the liposomal lipid bilayer, thereby modifying the surface characteristics of the nanoparticle. A continuous flow approach with controlled heating and mixing stages, along with one or more valves, and one or more spectrometers and/or surface characteristic analyzers, will enable the formation of nanoparticles with enhanced surface characteristics such as controlled surface thickness, degree of surface coverage/coating and degree of molecular moiety additions such as cellular targeting moieties or APIs.

As a third example, both doxorubicin-HCl and lipopolymer are added together and are subsequently injected into the liposomal phase at the mixing chamber 114. In this manner, the system 100 is used for the simultaneous intra-liposomal doxorubicin-HCl "active loading" and extra-liposomal surface modification. As such, the system 100 and methods disclosed herein can be used for the combination of the second implementation (controlled drug encapsulation) with the third implementation (modifying the surface of nanoparticles). This simultaneous drug loading and surface modifying approach designed as a continuous process enables a single unit operation that would otherwise require multiple steps or processes and reduces the overall processing time.

Figure 3:
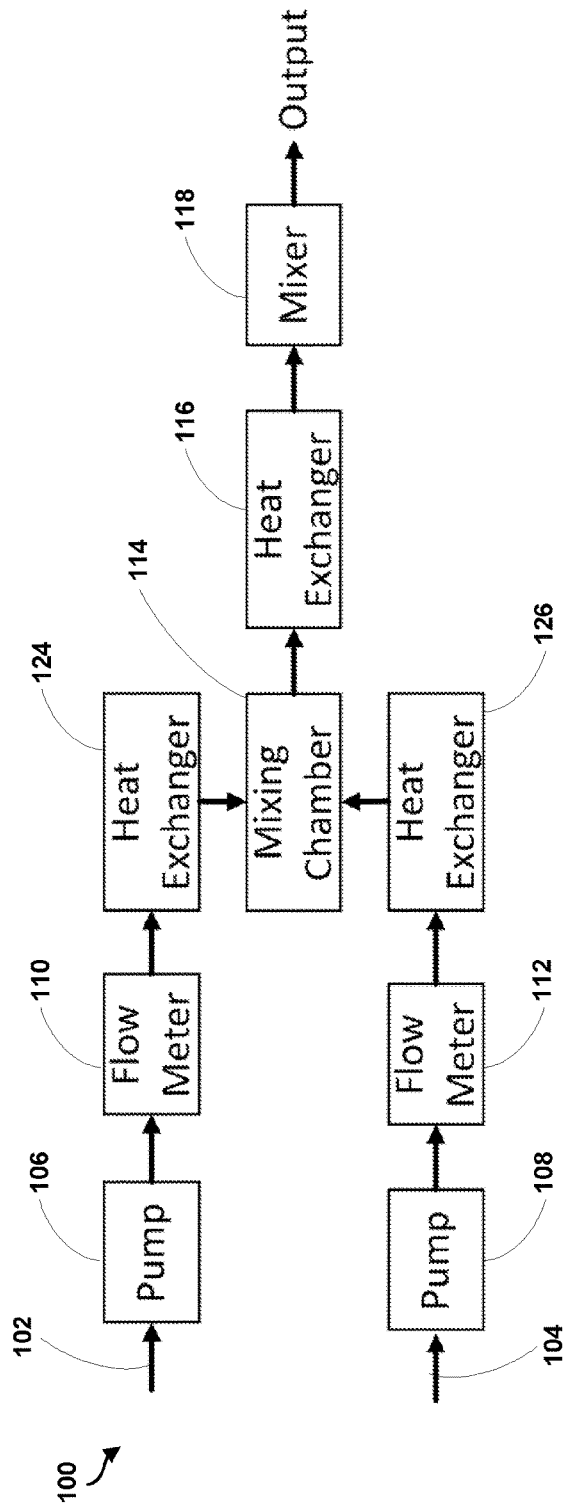
FIG. 3 is a schematic representation of another embodiment of the system of FIG. 2, according to an example embodiment.

FIG. 3 illustrates another embodiment of the system 100 where an additional heat exchanger is included at each inlet of the mixing chamber 114. In particular, FIG. 3 shows a second heat exchanger 124 positioned between the first flow meter 110 and the mixing chamber 114, and a third heat exchanger 126 positioned between the second flow meter 112 and the mixing chamber 114. These additional heat exchangers 124, 126 are used to initiate the active loading process and/or the post-insertion method, as outlined above, to take place in the mixing chamber 114.

Figure 4:
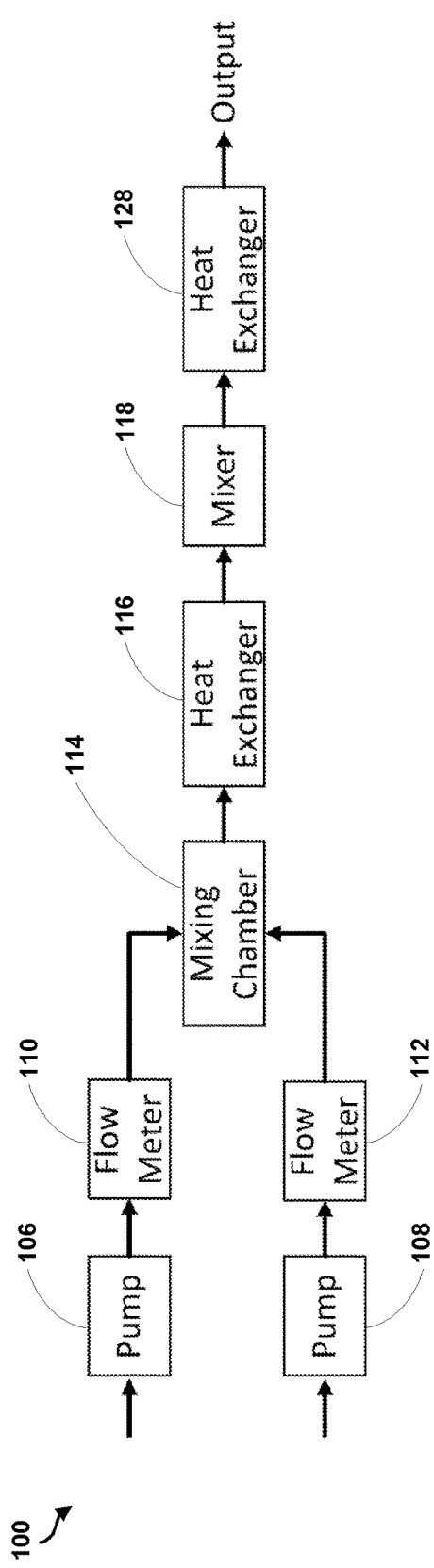
FIG. 4 is a schematic representation of another embodiment of the system of FIG. 2, according to an example embodiment.

FIG. 4 illustrates another embodiment of the system 100 where an additional heat exchanger 128 is positioned downstream from the first mixer 118. This additional heat exchanger 128 is used to increase the total surface area of heating, which can be used to increase the residence time at the set temperature of the two heat exchangers 116, 128 and promote a greater degree of nanoparticle modification. In one example, the first heat exchanger 116 is set at a first temperature, and the additional heat exchanger 128 is set at a second temperature that is less than the first temperature.

Figure 5:
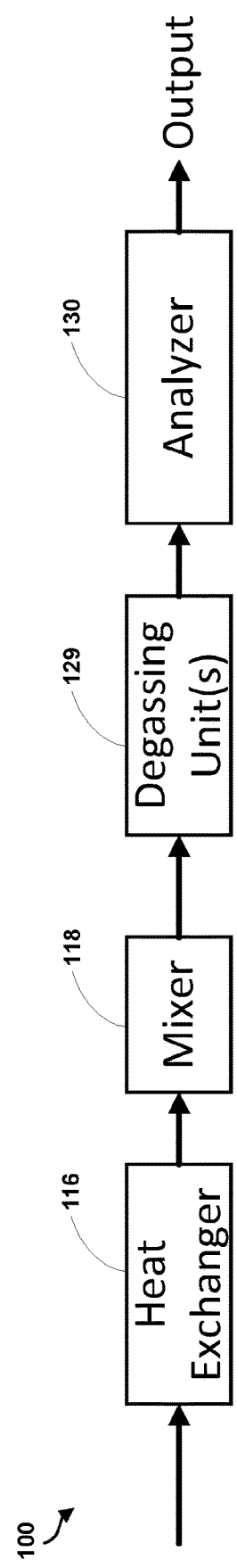
FIG. 5 is a schematic representation of another embodiment of the system of FIG. 2, according to an example embodiment.

FIG. 5 illustrates another embodiment of the system 100, where an analyzer 130 is located downstream of the first mixer 118. The analyzer 130 is configured to analyze one or more attributes of a plurality of modified nanoparticles formed by the system 100. The analyzer 130 may comprises a single analyzer, or may comprise two or more analyzers. The analyzer 130 may take a variety of forms, such as a near-infrared (NIR) spectrometer, ultraviolet-visible (UV-VIS) spectrometer, Raman spectrometer, a VIS-NIR fluorescence spectrometer, a particle analyzer, or a zeta-potential analyzer. In one example, the analyzer 130 comprises a spectrometer configured for in-line analysis of the plurality of modified nanoparticles. As one specific example, the analyzer 130 can be a UV-Vis spectrometer and is used to determine the amount of doxorubicin-HCl that is loaded into intra-liposomal space. As another example, the analyzer is a surface charge analyzer and is used to measure the surface charge characteristics, such as the zeta-potential of the liposomal dispersion. From the post-insertion method described above, the insertion of lipopolymer into the liposomal outer leaflet may cause the zeta-potential change in magnitude and charge (e.g. from positive to negative charge) depending on the degree of surface coverage, lipopolymer characteristics and original surface charge of the pre-formed liposomes. In this manner, the surface charge analyzer coupled with predictive algorithms can be used to determine the amount of lipopolymer surface coverage on the outer leaflet of the liposomal nanoparticle.

The system may also include a controller (e.g. a microprocessor, field programmable gate array (FPGA), microcontroller, or the like) configured to a controller configured to (i) determine a difference between one or more desired attributes of the plurality of modified nanoparticles and one or more determined attributes of the plurality of modified nanoparticles, and (ii) in response to the determined difference, adjust one or more parameters of the system. In one example, the one or more parameters comprise one or more of a flow rate of the first pump, a flow rate of the second pump, a temperature of the first heat exchanger, a flow rate of the first heat exchanger, and a concentration of pre-formed liposomes provided to the second inlet. In one example, the one or more desired attributes of the plurality of modified nanoparticles may comprise one of a size or a surface charge of the plurality of modified nanoparticles. In another example, the one or more desired attributes of the plurality of modified nanoparticles comprises one or more physical characteristics of crystal growth in the plurality of modified nanoparticles including an amount of intra-vesicular crystal, a crystal packing, one or more dimensions of the intra-vesicular crystal, a quantity of crystals within an intra-vesicular space, a three dimensional space occupied by a crystal structure, and one or more surface characteristics.

As shown in FIG. 5, the system 100 may further include one or more degassing units 129 positioned upstream from the analyzer 130. The one or more degassing units 129 are used to stabilize the modified nanoparticles and remove dissolved gases that may interfere with the measurements performed by the analyzer 130.

FIG. 6 illustrates an embodiment similar to FIG. 5, where the first heat exchanger 116 and first mixer 118 that are downstream from the mixing chamber 114 have one or more series of heat exchangers and mixers. As such, the system 100 may include one or more additional heat exchangers each in fluid communication with one or more additional mixers, where each of the one or more additional heat exchangers and the one or more additional mixers are positioned downstream from the first heat exchanger 116.

These additional heat exchangers and mixers are used to increase the residence time at the setpoint temperatures and are also used to increase the amount of mixing. Any of the heat exchangers described herein may have a heat transfer area of 0.001 to 100 feet-squared.

FIG. 7 illustrates an embodiment similar to FIG. 6 with, except that the heat exchanger and the mixer are combined into a single unit 117.

Figure 8:
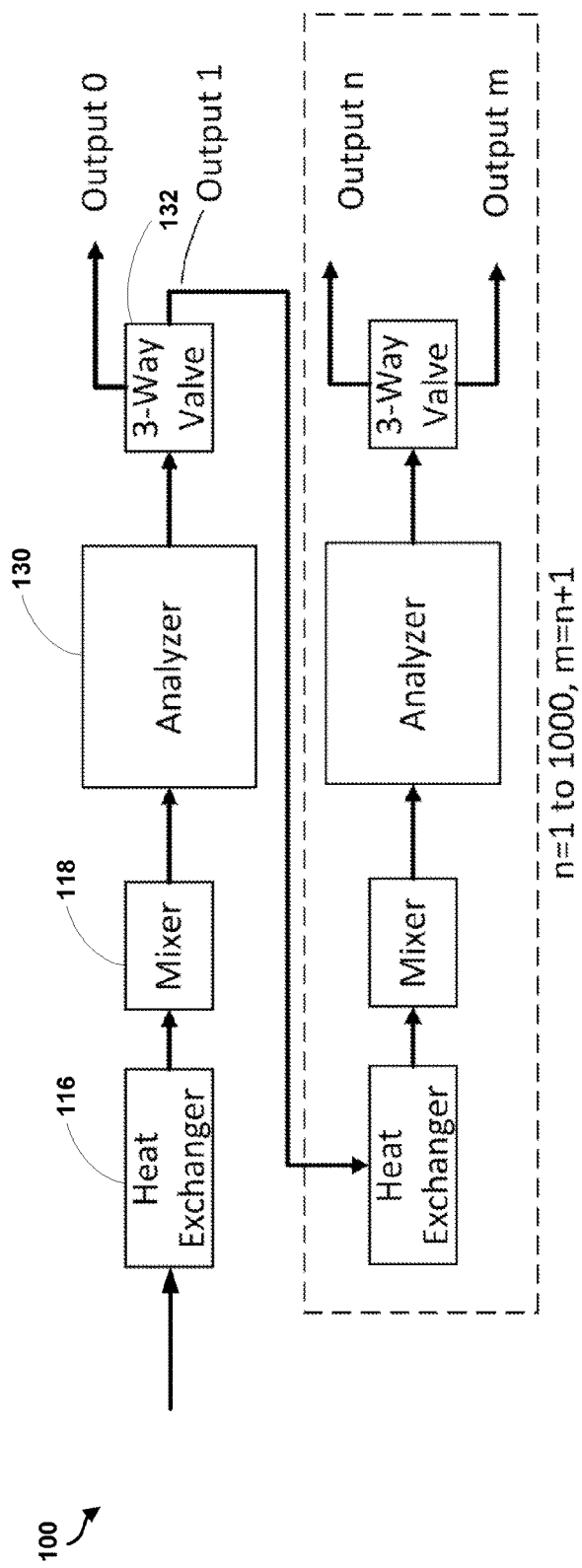
FIG. 8 is a schematic representation of another embodiment of the system of FIG. 2, according to an example embodiment.

FIG. 8 illustrates the first heat exchange 116, the first mixer 118, the analyzer 130, and a three-way valve 132 in fluid communication with the analyzer 130. FIG. 8 further illustrates that three-way valve 132 directs the plurality of modified nanoparticles to a first output or a second output based on the one or more determined attributes of the plurality of modified nanoparticles as determined by the analyzer 130. In one example, the first output comprises an exit of the system, and the second output is in fluid communication with one or more additional heat exchangers, mixers, and/or three-way valves as shown in FIG. 8. The three-way valves 132 are incorporated to direct the fluid flow to either exit the system or to continue to the next set of elements. In one example, doxorubicin-HCl is loaded into liposomes as outlined above, and where the analyzers are ultraviolet-visible light spectrometers, which are used to determine the total amount of doxorubicin-HCl that entered into the intra-liposomal space. Upon the doxorubicin-HCl/liposomal mixture flowing through each analyzer, a user-defined setpoint (e.g. 90% encapsulated) can be used to determine if the liposomal dispersion continues to the next set of elements or exits the system. In this case, if the doxorubicin-HCl/liposomal mixture was at only 75% encapsulated when it passed through the first set of elements, then the process stream would continue through the next n sets of elements until the desired setpoint of 90% or greater was reached.

Figure 9:
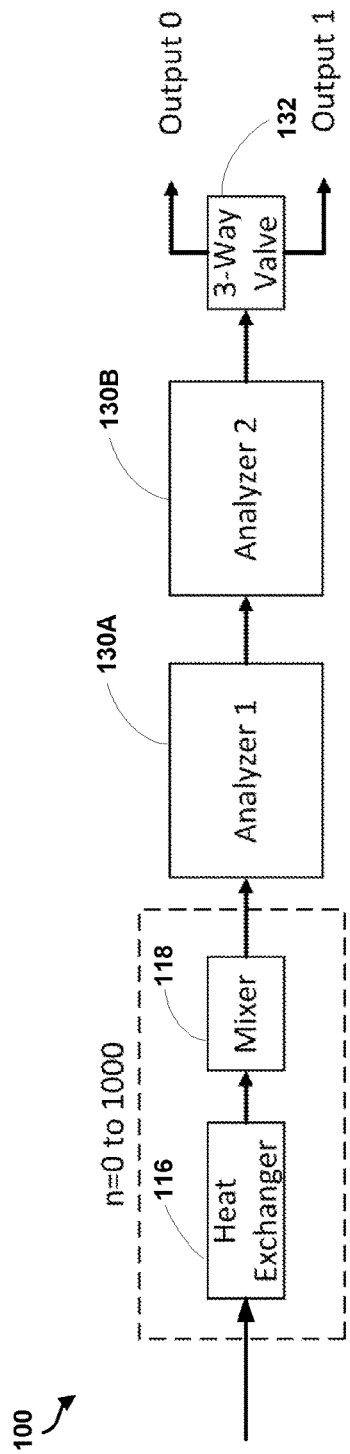
FIG. 9 is a schematic representation of another embodiment of the system of FIG. 2, according to an example embodiment.

FIG. 9 illustrates another embodiment of the system 100, which incorporates a series of heat exchangers and mixers with two or more analyzers in fluid communication with the mixer. In particular, FIG. 9 illustrates a first analyzer 130A positioned downstream from the first heat exchanger 116, and a second analyzer 130B positioned downstream from the first analyzer 130A. The first analyzer 130A is configured to measure a first attribute of the plurality of modified nanoparticles, and the second analyzer 130B is configured to measure a second attribute of the plurality of modified nanoparticles that is different than the first attribute. In one example, the first attribute comprises an internal property of the plurality of modified nanoparticles (e.g. determining crystal growth and/or molecule encapsulation), and the second attribute comprises an external property of the plurality of modified nanoparticles (e.g. surface characteristics of the nanoparticle). This dual analyzer approach can be used when more than one nanoparticle modification is being performed simultaneously, e.g. the molecular loading or crystal growth in the intra-liposomal space and post-insertion of lipopolymers to the outer leaflet of the liposomal bilayer. Each analyzer can be coupled with predictive algorithms to determine if user-defined setpoints were achieved, and this information can then be used to determine which direction the process stream will flow out of the three-way valve 132.

Figure 10:
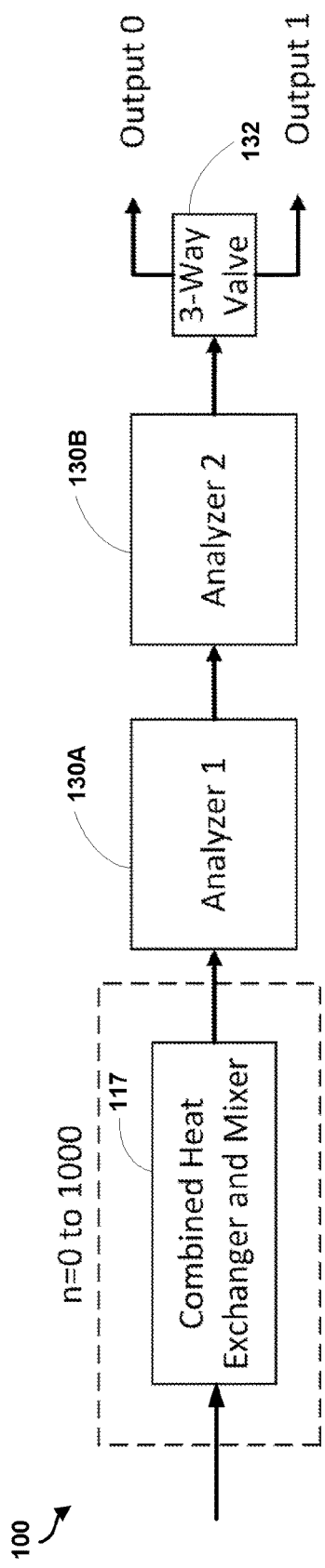
FIG. 10 is a schematic representation of another embodiment of the system of FIG. 2, according to an example embodiment.

FIG. 10 illustrates the embodiment of FIG. 9, except that the first heat exchanger 116 and the first mixer 118 are combined into a single unit 117.

Figure 11:
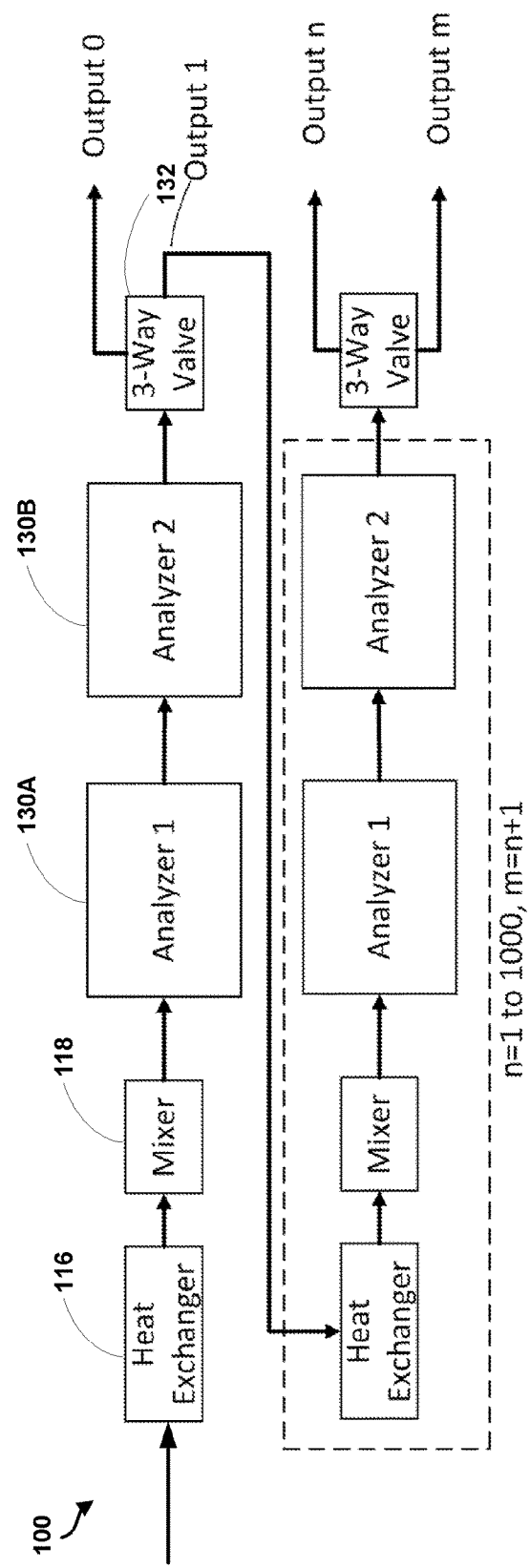
FIG. 11 is a schematic representation of another embodiment of the system of FIG. 2, according to an example embodiment.

FIG. 11 illustrates an embodiment that combines the embodiments of FIG. 8 and FIG. 9. In this manner, two or more sets of analyzers 130A, 130B are used to determine multiple attributes. In one particular example, the user-defined values for doxorubicin-HCl encapsulation may be 90% and the surface coverage of the lipopolymer may be 80%. One possible algorithm that could be implemented would continue the pass the doxorubicin-HCl/liposomal dispersion through multiple sets of elements (a heat exchanger, mixer, a first analyzer, a second analyzer, and three-way valve) until both user-define attributes were reached. A second possible algorithm would selectively change the temperature of one or more heating exchangers to reach the user-defined values. In this manner, the system can be configured with one or more predictive algorithms to determine how to achieve the user-define setpoints simultaneously.

Figure 12:
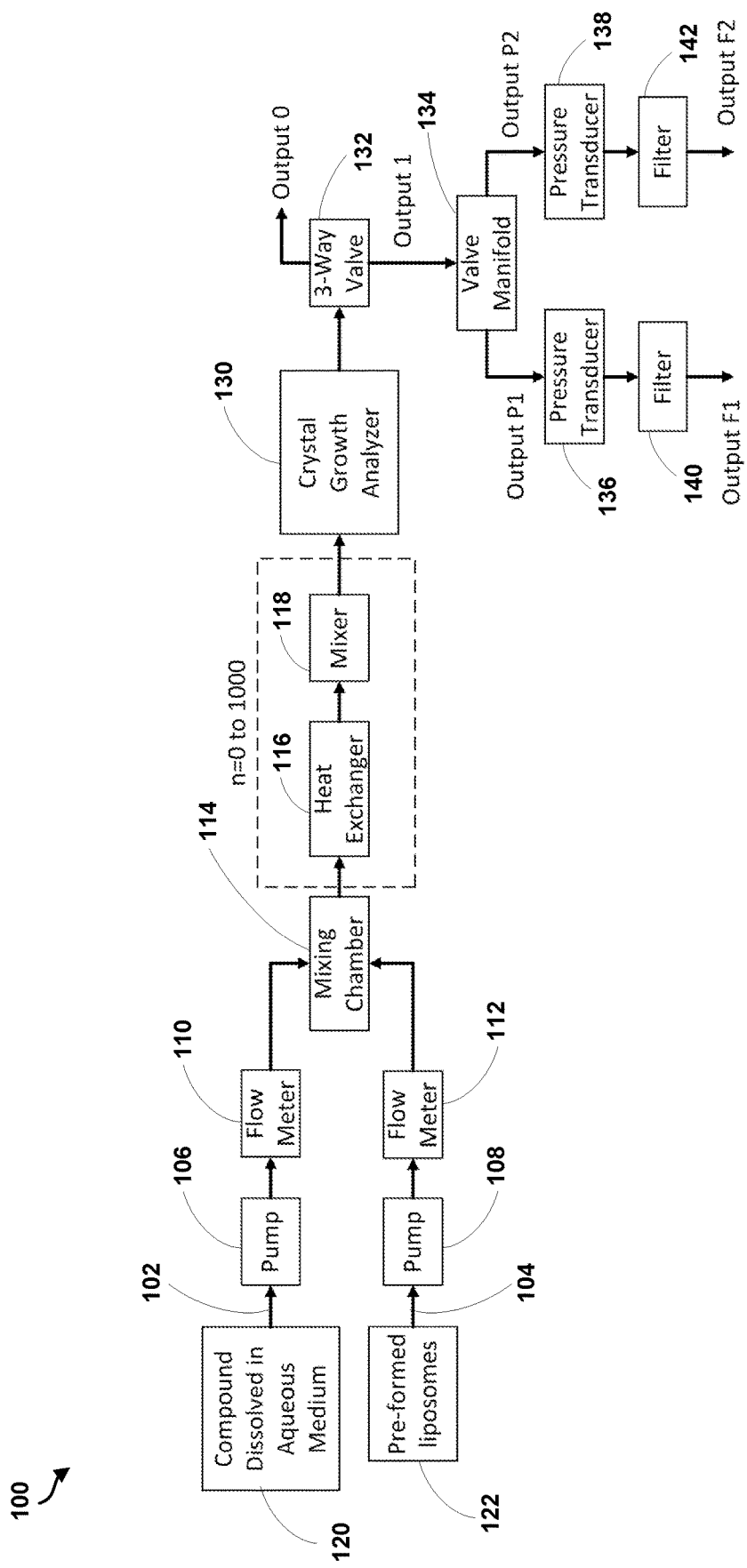
FIG. 12 is a schematic representation of another embodiment of the system of FIG. 2, according to an example embodiment.

FIG. 12 illustrates a valve manifold 134 in fluid communication with the second output of the three-way valve 132. The valve manifold 134 comprises a first output and a second output. The system 100 of FIG. 12 further includes a first pressure transducer 136 in fluid communication with the first output of the valve manifold 134, and a second pressure transducer 138 in fluid communication with the second output of the valve manifold 134. The system 100 also includes a first filter 140 in fluid communication with the first pressure transducer 136, and a second filter 142 in fluid communication with the second pressure transducer 138. The first filter 140 and the second filter 142 may comprise 0.22 μm filters that are designed for sterile filtration. The valve manifold 134 is capable of switching from one filter to another depending on the pressure between the filter and the valve manifold 134 as detected by the pressure transducers 136, 138. If the pressure exceeds a set-point, the valve manifold will switch to another filter, where the filter that was at the high pressure is replaced with a new filter. That process repeats and the valve manifold 134 can keep switching between the filters 140, 142 until system shutdown.

Figure 13:
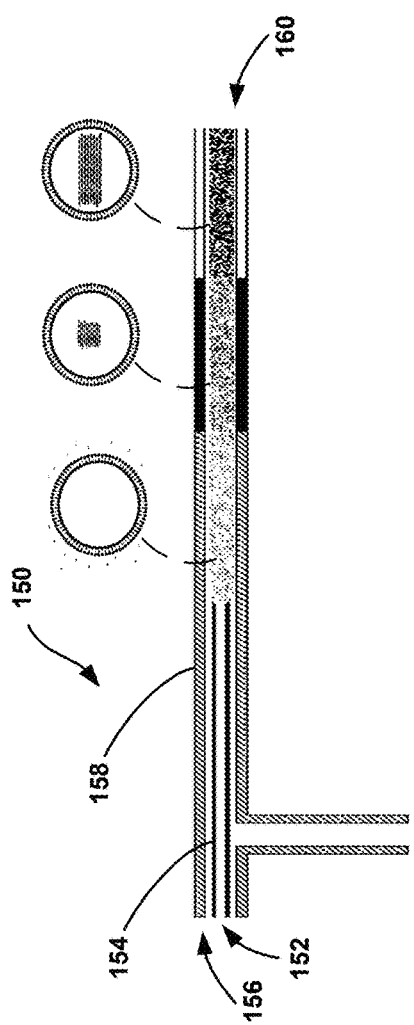
FIG. 13 is an example of controlled molecular growth where the turbulent jet mixer is in co-flow, according to an example embodiment.

FIG. 13 is an example of a turbulent jet in co-flow that can be used to mix both process streams together. In this manner, one stream (e.g. the molecule to be entrapped) is injected directly into the centerline of the second stream (e.g. preformed liposomes) and the difference in flow characteristics can establish a turbulent jet to form, which can be used to mix both process streams. A heating zone and a static mixing zone downstream from where the process streams are mixing can promote molecular growth of intra-liposomal crystal structures. As such, the structure illustrated in FIG. 13 could be used as the mixing chamber 114 described above. In such an example, and as illustrates in FIG. 13, in one example the mixing chamber comprises an injection port 150 including (i) a third inlet 152 including a first tube 154 in fluid communication with the first inlet 102, (ii) a fourth inlet 156 including a second tube 158 in fluid communication with the second inlet 104, and (iii) an outlet 160, wherein the second tube 158 extends through the outlet 160 of the injection port 150, and wherein the first tube 154 is positioned concentrically within the second tube 158 and terminates within the second tube 158. In one example, the first inlet 102 includes pre-formed liposomes and the second inlet 104 includes a compound dissolved in an aqueous medium. In another example, the first inlet 102 includes a compound dissolved in an aqueous medium and the second inlet 104 includes pre-formed liposomes. A degree of crystal growth in such a system is controlled by heating duration and degree of mixing.

Figure 14:
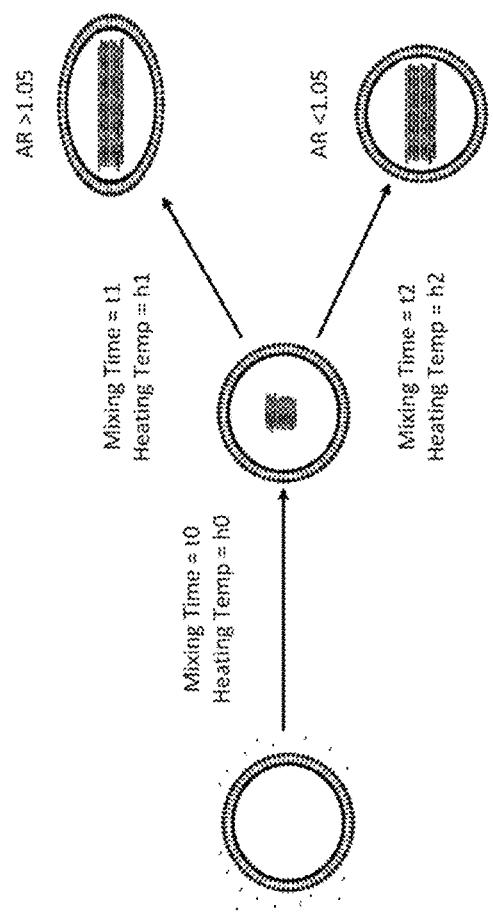
FIG. 14 is an example mechanism of molecular growth within the liposomal core, according to an example embodiment.

FIG. 14 is an example of the mechanism of molecular growth within an intra-liposomal space. Different residence times are required to achieve different degrees of molecular growth. Some of the factors that can affect molecular growth such as intra- and extra-liposomal salt concentration, intra- and extra-liposomal pH values, the encapsulating molecule/total lipid ratio, total volumetric flow rate, extent of mixing, temperatures of the heat exchangers, surface area of the mixers and surface area of the heat exchangers can be used to control the growth of the intra-liposomal crystal. In some cases, the intra-liposomal crystal will only grow to the diameter of the pre-formed liposomes, resulting in an apparent aspect ratio of around less than 1.05 (nearly spherical particle). However, if the intra-liposomal crystal continues to grow under certain conditions (e.g. excess heat transfer, increased residence times, etc), then the intra-liposomal crystal may form elongated structures, with an AR of >1.05 and thus caused the liposomal nanoparticle to exhibit a non-spherical morphology.

Figure 15:
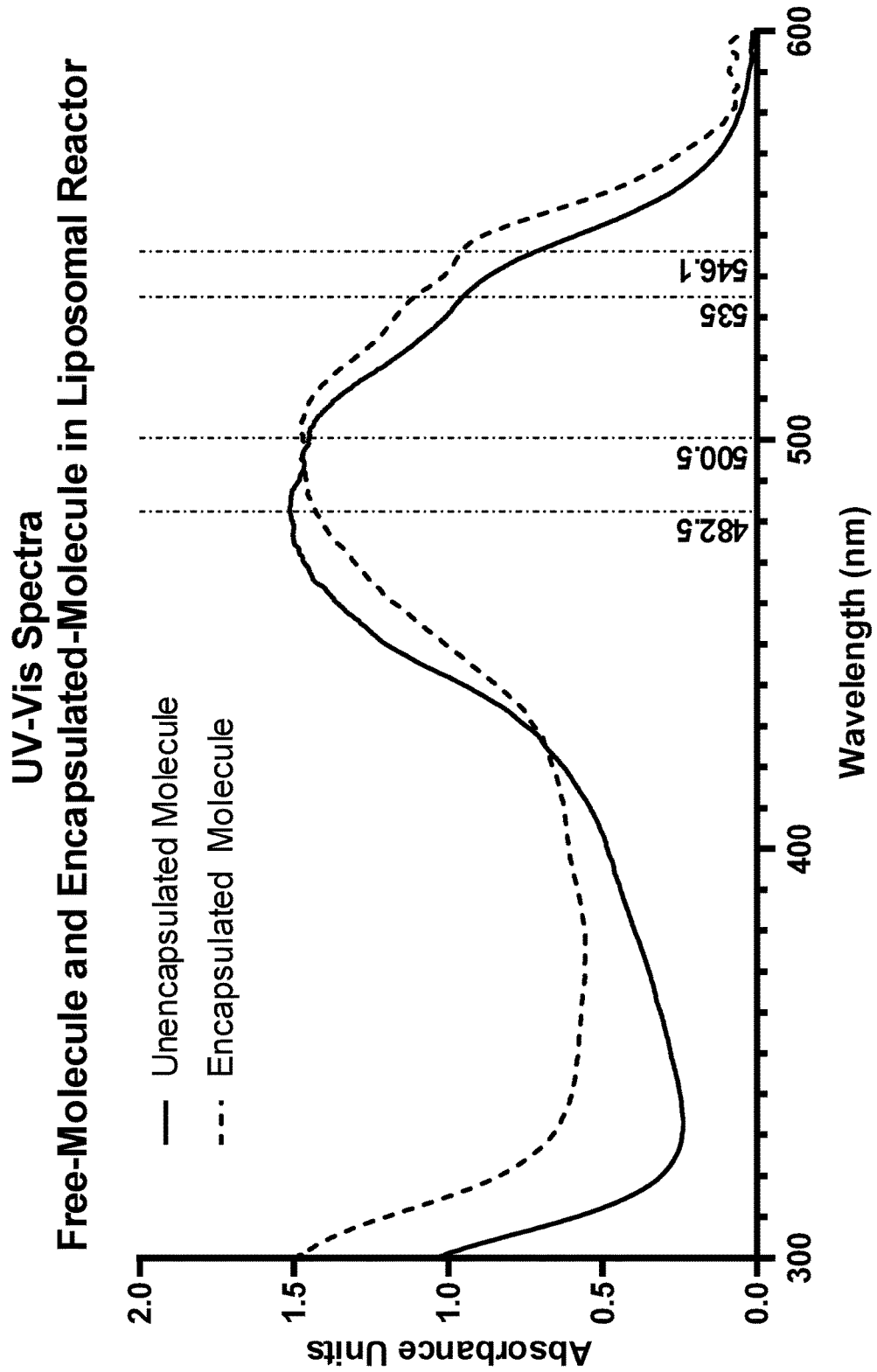
FIG. 15 illustrates an electronic spectrum shift and new peak formation of an unencapsulated molecule and the encapsulated molecule, according to an example embodiment.

FIG. 15 is an example of how electronic spectrum may shift for a free-molecule (unencapsulated) and an encapsulated molecule that is undergoing crystal growth. This electronic spectrum is an example absorbance spectrum for doxorubicin-HCl over the ultraviolet-visible light range. The encapsulated molecule spectrum is red-shifted when compared to the unencapsulated molecule spectrum. In addition, a new shoulder appears near 535 nm and the shoulder near 546 nm becomes more prominent. By incorporating the spectral changes into a statistical design and analyzing the ratios of selected wavelengths, along with the total concentration of the doxorubicin-HCl in the sample, a predictive expression was formed that can be used to determine the amount of doxorubicin-HCl in the intra-liposomal space. This predictive equation has an R-squared of 0.99 and has less than 2% error. In this manner, electronic spectrum data can be used to determine crystal growth and extent of growth within the intra-liposomal space. Moreover, by coupling this electronic spectrum analysis with particle size analysis of the liposomes with encapsulated doxorubicin-HCl, the morphological changes can be further examined and characterized to enhance the predictive power for intra-liposomal crystal growth.

Below is an example of an expression that can be used to determine the encapsulated molecule percentage by taking ratios of wavelengths in the electronic spectrum at selected wavelengths.

$$[\text{Molecule Encapsulation}] = (-39.6) + 0.034 * Y3 + 219.6 * Y1 - 60.72 * Y2 + (Y3 - 72.83) * ((Y2 - 1.742) * 0.1104) + (Y3 - 72.83) * [(Y1 - 1.027) * 4.569) + Y1 - 1.027] * ((Y2 - 1.742) * 726.2) + (Y3 - 72.83) * ((Y2 - 1.742) * (Y1 - 1.027) * 16.82))$$

[Molecule Encapsulation]=Concentration of Intralipo-somal Molecule

ABS=Absolute Value

Y1=(ABS 500/482), where 500 and 482 represent Absorbance Units at respective wavelengths in nm.

Y2=(ABS 482/546), where 482 and 546 represent Absorbance Units at respective wavelengths in nm.

Y3=Total Concentration of Molecule (Encapsulated and Unencapsulated)

Figure 16:
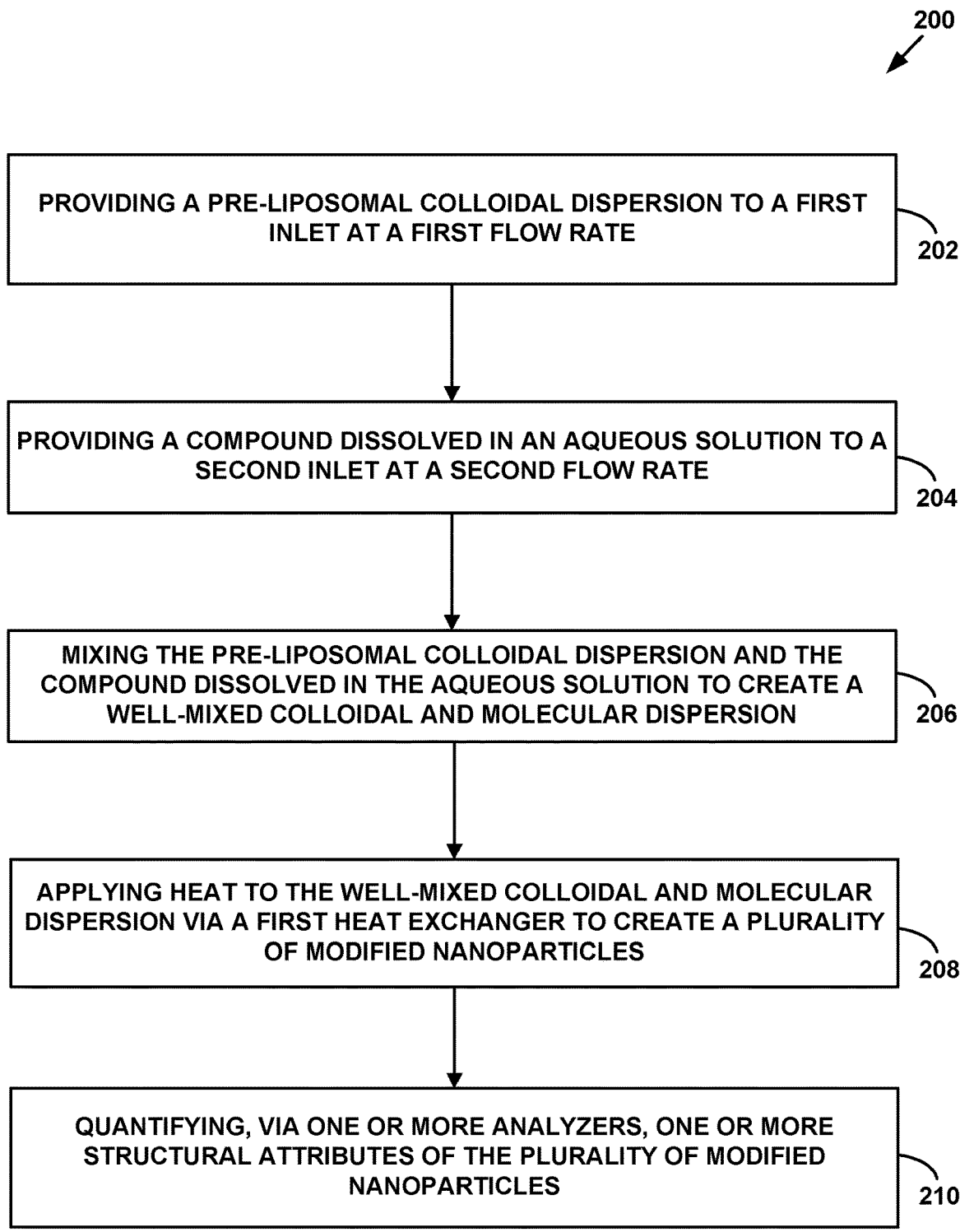
FIG. 16 is a flowchart illustrating an example method, according to an example embodiment.

FIG. 16 is a block diagram of a method 200 for internal and external modification of nanoparticles in a continuous process. Method 200 shown in FIG. 16 presents an embodiment of a method that could be used by the system 100 of FIGS. 1-15, as an example. Method 200 may include one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Initially, at block 202, the method 200 includes providing a pre-liposomal colloidal dispersion to a first inlet at a first flow rate. At block 204, the method 200 further includes providing a compound dissolved in an aqueous solution to a second inlet at a second flow rate. At block 206, the method 200 further includes mixing the pre-liposomal colloidal dispersion and the compound dissolved in the aqueous solution to create a well-mixed colloidal and molecular dispersion. At block 208, the method 200 further includes applying heat to the well-mixed colloidal and molecular dispersion via a first heat exchanger to create a plurality of modified nanoparticles. At block 210, the method 200 further includes quantifying, via one or more analyzers, one or more structural attributes of the plurality of modified nanoparticles.

The quantification of the one or more structural attributes can take a variety of forms. As examples, the one or more structural attributes of the plurality of modified nanoparticles comprise one or more of a particle size, a particle size distribution, an amount of intra-liposomal crystal, a crystal packing, one or more dimensions of the intra-liposomal crystal, a quantity of crystals within an intra-liposomal space, and a three dimensional space occupied by a crystal structure.

In one example, the method 200 further includes providing the plurality of modified nanoparticles to a static mixer, where the compound enters a liposomal core in the static mixer. In another example, the method 200 further includes reducing a temperature of the well-mixed colloidal and molecular dispersion via the heat exchanger to create a temperature-controlled colloidal and molecular dispersion that halts or reduces crystal growth.

In another example, the method 200 further includes (i) determining a difference between a desired structural attribute of the plurality of modified nanoparticles and a determined structural attribute of the plurality of modified nanoparticles, and (ii) in response to the determined difference, adjusting one or more of the second flow rate, a mixing time of the pre-liposomal colloidal dispersion and the compound in the aqueous solution, a temperature of the first heat exchanger, and a flow rate of the first heat exchanger.

In one example of the method 200, a residence time inside the first heat exchanger is adjusted to control a structural formation of a crystal structure in the plurality of modified nanoparticles. The first flow rate can range between about 1 mL/min and about 5,000 mL/min, and the second flow rate can range between about 1 mL/min and about 5,000 mL/min.

In one example, as discussed above in relation to FIG. 13, the first inlet is in fluid communication with a first tube, the second inlet is in fluid communication with a second tube, the first tube is positioned concentrically within the second tube, and the first tube terminates within the second tube, and the well-mixed colloidal and molecular dispersion is created at a location within the second tube where the first tube terminates. The method 200 can further include providing the compound in the aqueous solution to the second inlet at the second flow rate causes a turbulent jet to form.

As discussed above, the one or more analyzers may comprise one or more of a near-infrared (NIR) spectrometer, ultra-violet (UV-VIS) spectrometer, Raman spectrometer or a VIS-NIR fluorescence spectrometer, a particle analyzer, or a zeta-potential analyzer.

In one example, the one or more analyzers comprise (i) a first analyzer positioned downstream from the first heat exchanger, where the first analyzer is configured to measure a first attribute of the plurality of modified nanoparticles, and (ii) a second analyzer positioned downstream from the first analyzer, where the second analyzer is configured to measure a second attribute of the plurality of modified nanoparticles that is different than the first attribute.

In one example, the method 200 further includes (i) heating, via a second heat exchanger positioned between the first heat exchanger and the first inlet, the pre-liposomal colloidal dispersion, and (ii) heating, a third heat exchanger positioned between the first heat exchanger and the second inlet, the compound dissolved in the aqueous solution. These additional heat exchangers are used to initiate the active loading process and/or the post-insertion method, as outlined above, to take place in the mixing chamber.

In another example, a valve manifold having a first output and a second output is positioned in fluid communication with the one or more analyzers, as discussed above in relation to FIG. 12. In such an example, the method 200 can further include (i) detecting, via a first pressure transducer in fluid communication with a first output of the valve manifold, a pressure between a first filter and the valve manifold, and (ii) if the detected pressure exceeds a threshold, then causing the valve manifold to close the first output and open the second output. In such an example, the valve manifold is capable of switching from one filter to another depending on the pressure between the filter and the valve manifold. If the pressure exceeds a set-point, the valve manifold will switch to another filter, where the filter that was at the high pressure is replaced with a new filter. This process repeats and the valve can keep switching between the filters until system shutdown.

In another example, the method 200 further includes (i) determining a difference between a desired structural attribute of the plurality of modified nanoparticles and a determined structural attribute of the plurality of modified nanoparticles, (ii) if the determined difference is between a first threshold and a second threshold that is greater than the first threshold, providing the plurality of modified nanoparticles to an outlet, and (iii) if the determined difference is less than the first threshold, providing the plurality of modified nanoparticles back to the first heat exchanger. Such a method is illustrated in additional detail in FIG. 17.

Figure 17:
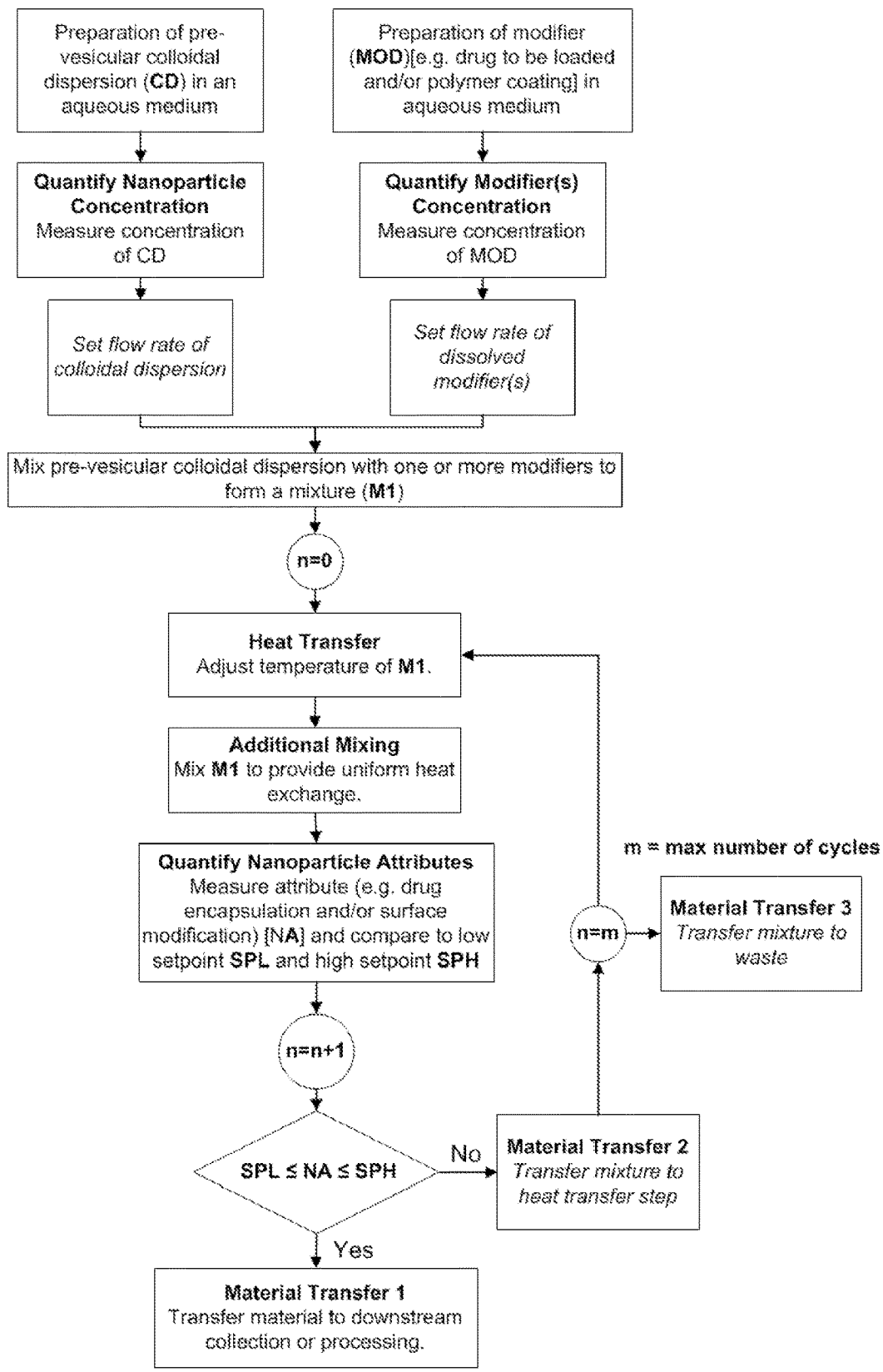
FIG. 17 is a flowchart illustrating another example method, according to an example embodiment.

In particular, as shown in FIG. 17, a pre-vesicular colloidal dispersion (CD) is prepared in an aqueous medium, and a modifier (MOD) (e.g. compound or drug to be loaded and/or polymer coating) is prepared in an aqueous medium. As used herein, the term "compound" and "modifier" are used interchangeably. The concentration of the CD and MOD is then determined, and a flow rate of the colloidal dispersion and a flow rate of the dissolved modifier(s) is set. The pre-vesicular colloidal dispersion with the dissolved modifiers are then mixed to form a mixture (M1). Heat is added to M1, and M1 is further mixed to provide uniform heat exchange throughout the mixture. One or more attributes of M1 are then measured (e.g. drug encapsulation and/or surface modification). The measured one or more attributes are compared to a low threshold (or low set point) as well as a high threshold (or high set point). If the measured one or more attributes are between the low threshold and the high threshold, then the M1 material is transferred downstream for collection or further processing. If the measured one or more attributes are above the high threshold, then the M1 material goes to waste. If the measured one or more attributes are under the low threshold, then the M1 material continues to the next set of heat exchangers and mixers. If the measured one or more attributes are under the low threshold there are no more heat exchangers/mixers in the process, then the M1 material goes to waste.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described examples, it is intended that all matters in the preceding description and shown in the accompanying figures be interpreted as illustrative and not in a limiting sense.

The invention claimed is:

1. A system for internal and external modification of pre-formed nanoparticles in a continuous process, the system comprising:
   a first inlet;
   a second inlet;
   a first pump in fluid communication with the first inlet;
   a second pump in fluid communication with the second inlet;
   a first flow meter in fluid communication with the first pump;
   a second flow meter in fluid communication with the second pump;

a mixing chamber in fluid communication with the first flow meter and the second flow meter;
a first heat exchanger in fluid communication with the mixing chamber;
a first analyzer positioned downstream from the first heat exchanger, wherein the first analyzer is configured to measure a first attribute of a plurality of modified pre-formed nanoparticles;
a second analyzer positioned downstream from the first analyzer, wherein the second analyzer is configured to measure a second attribute of the plurality of modified pre-formed nanoparticles that is different than the first attribute; and
a controller configured to:
determine a difference between one or more desired attributes of the plurality of modified nanoparticles and one or more determined attributes of the plurality of modified nanoparticles; and
in response to the determined difference, adjust one or more parameters of the system.

2. The system of claim 1, further comprising:
a first mixer in fluid communication with the first heat exchanger.

3. The system of claim 2, wherein the first heat exchanger and first mixer are combined into a single component.

4. The system of claim 1, wherein the first inlet is in fluid communication with a first container, and wherein the second inlet is in fluid communication with a second container.

5. The system of claim 1, further comprising:
a second heat exchanger positioned between the first flow meter and the mixing chamber; and
a third heat exchanger positioned between the second flow meter and the mixing chamber.

6. The system of claim 5, wherein the controller is configured to adjust a flow rate of the first pump to the second heat exchanger and a flow rate of the second pump to the third heat exchanger, and to adjust a temperature of the second heat exchanger and the third heat exchanger.

7. The system of claim 1, further comprising:
one or more additional heat exchangers each in fluid communication with one or more additional mixers, wherein each of the one or more additional heat exchangers and the one or more additional mixers are positioned downstream from the first heat exchanger.

8. The system of claim 1, wherein the mixing chamber is a static mixer configured to combine solutions from the first inlet and the second inlet.

9. The system of claim 1, wherein the mixing chamber comprises an injection port including:
a third inlet including a first tube in fluid communication with the first inlet including pre-formed liposomes;
a fourth inlet including a second tube in fluid communication with the second inlet including a compound dissolved in an aqueous medium; and
an outlet, wherein the second tube extends through the outlet of the injection port, and wherein the first tube is positioned concentrically within the second tube and terminates within the second tube.

10. The system of claim 1, wherein the mixing chamber comprises an injection port including:
a third inlet including a first tube in fluid communication with the first inlet including a compound dissolved in an aqueous medium;
a fourth inlet including a second tube in fluid communication with the second inlet including pre-formed liposomes; and
an outlet, wherein the second tube extends through the outlet of the injection port, and wherein the first tube is positioned concentrically within the second tube and terminates within the second tube.

11. The system of claim 1, wherein the one or more parameters comprise one or more of a flow rate of the first pump, a flow rate of the second pump, a temperature of the first heat exchanger, a flow rate of the first heat exchanger, and a concentration of pre-formed liposomes provided to the second inlet.

12. The system of claim 1, wherein the one or more desired attributes of the plurality of pre-formed modified nanoparticles comprises one of a size or a surface charge of the plurality of pre-formed modified nanoparticles.

13. The system of claim 1, wherein the one or more desired attributes of the plurality of pre-formed modified nanoparticles comprises one or more physical characteristics of crystal growth in the plurality of pre-formed modified nanoparticles including an amount of intra-vesicular crystal, a crystal packing, one or more dimensions of the intra-vesicular crystal, a quantity of crystals within an intra-vesicular space, a three dimensional space occupied by a crystal structure, and one or more surface characteristics.

14. The system of claim 1, wherein the first analyzer and/or the second analyzer comprise a spectrometer configured for in-line analysis of the plurality of pre-formed modified nanoparticles.

15. The system of claim 1, wherein the first analyzer and/or the second analyzer comprise one or more of a near-infrared (NIR) spectrometer, ultraviolet-visible (UV-VIS) spectrometer, Raman spectrometer, a VIS-NIR fluorescence spectrometer, a particle analyzer, or a zeta-potential analyzer.

16. The system of claim 1, further comprising:
a three-way valve in fluid communication with the first analyzer and/or the second analyzer, wherein the three-way valve directs the plurality of pre-formed modified nanoparticles to a first output or a second output based on the one or more determined attributes of the plurality of pre-formed modified nanoparticles.

17. The system of claim 16, wherein the first output comprises an exit of the system, and wherein the second output is in fluid communication with one or more additional heat exchangers, mixers, and/or three-way valves.

18. The system of claim 16, further comprising:
a valve manifold in fluid communication with the second output of the three-way valve, wherein the valve manifold comprises a third output and a fourth output;
a first pressure transducer in fluid communication with the third output of the valve manifold;
a second pressure transducer in fluid communication with the fourth output of the valve manifold;
a first filter in fluid communication with the first pressure transducer; and
a second filter in fluid communication with the second pressure transducer.

19. The system of claim 1, wherein the first attribute comprises an internal property of the plurality of pre-formed modified nanoparticles, and wherein the second attribute comprises an external property of the plurality of pre-formed modified nanoparticles.

20. The system of claim 19, wherein the internal property comprises intra-vesicular crystal growth and/or molecule encapsulation of the nanoparticles, and the external property comprises extravesicular surface characteristics of the nanoparticles.

21. The system of claim 1, further comprising:
one or more degassing units positioned upstream from the first analyzer and/or the second analyzer.

\* \* \* \* \*